United States Patent Office 3,412,165
Patented Nov. 19, 1968

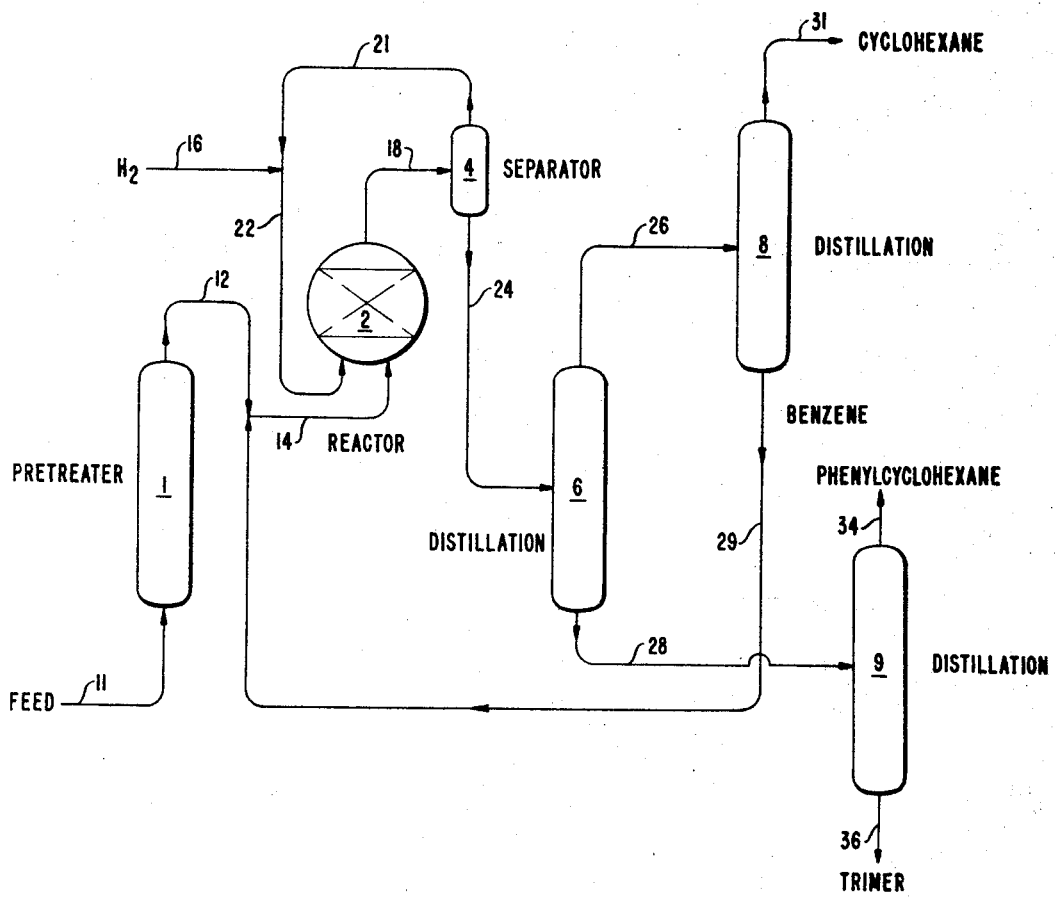

3,412,165
PHENYLCYCLOHEXANE PROCESS
Lynn H. Slaugh, Lafayette, Calif., and John A. Leonard, Swindon, Wilts, England, assignors to Shell Oil Company, New York, N.Y., a corporation of Delaware
Filed Feb. 15, 1967, Ser. No. 616,356
8 Claims. (Cl. 260—667)

ABSTRACT OF THE DISCLOSURE

A process for the production of phenycyclohexane in which benzene is contacted in the presence of hydrogen and a catalyst which is composed of tungsten and another hydrogenation metal component supported on a halogen activated and containing solid support. Catalytic selectivity is maintained by minimizing sulfur and water content of the benzene feed and conducting the reaction under conditions where benzene feed and phenylcyclohexane product are maintained in substantially the liquid phase.

---

This invention relates to hydroimerization of aromatic hydrocarbon compounds to produce aryl naphthenes and/or alky-substituted aryl naphthenes. More particularly, it relates to an improved process and catalyst for conversion of benzene to phenylcyclohexane.

Phenylcyclohexane is a known and valuable solvent and chemical intermediate. It can be converted in high yield to phenol and cyclohexanone by autoxidation with subsequent acid treatment as disclosed in British Patent No. 681,613, issued Oct. 29, 1952 to McCall et al. It is also useful as an intermediate in the production of cyclohexene which in turn can be utilized for the production of adipic acid and caprolactan. See, for example, Fetterly, U.S. 2,839,590, issued June 17, 1950.

As early as 1934 it was found that phenylcyclohexane could be produced by hydrodimerization of benzene. Truffault reported conversion of benzene to cyclohexane and phenylcyclohexane in the presence of a catalyst which consisted of nickel black and phosphorous pentoxide (Truffault, Bull. Soc. Chim. No. 5, vol. 1, pp. 391–406 (1934). More recently, conversion of benzene to phenylcyclohexane has been accomplished by using a mixture of hydrogenation catalyst and a heteropolyacid supported on a carrier (Logemann, U.S. 3,153,678, Oct. 20, 1964), and hydrogenation catalyst supported on a silica-alumina cracking catalyst (French Patent No. 1,326,722, issued Apr., 1963 to Stamicarbon). It has also been proposed to accomplish the conversion with alkali metal catalyst supported on alumina.

None of the above proposals has yet been proved for stable continuous operation necessary for commercial exploitation. Problems therewith include high catalyst cost, catalyst stability and regeneration.

We have now discovered a process utilizing an improved catalyst which provides not only excellent selectivity of benzene to phenylcyclohexane, but which is suitable for continuous operation.

Hydrodimerization of benzene to phenylcyclohexane is generally assumed to be accomplished by alkylation of benzene with cyclohexene which is formed as an intermediate from the hydrogenation of benzene. Thus, dual catalytic functions of hydrogenation and alkylation are required. Hydrogenation is, of course, achieved over a metallic catalyst component whereas alkylation requires an acid component. Accordingly, in theory, any catalyst with dual hydrogenation and acidic functions will suffice. In practice, such has not proven the case. If hydrogenation activity is predominant and acidity weak—as with platinum on alumina—cyclohexane is the principal product. Conversely, if hydrogenation is weak and acidity predominant—as with a dual function catalyst with poisoned metallic component-alkylation to trimer and cracking to lower molecular weight compounds results. Thus, the dual catalytic functions of the catalyst must be strong—to achieve activity—and balanced—to achieve selectivity to the desired products. Moreover, as the catalyst ages the balance between the functions must be maintained.

The present invention is a process utilizing an improved catalyst which accomplishes and maintains the above objectives surprisingly well. Silica-alumina cracking catalyst have long been known as strong catalytic acids. In addition, use of solid silica-alumina provides a support for other catalytic components. Silica-alumina modified with a halogen—as chlorine, bromine, iodine or fluorine—are even stronger acids. Fluorine is particularly desirable for its stability and resistance from being stripped off the carrier. Thus, silica-alumina catalyst modified with fluorine provide the preferable acidic catalyst function. Although silica-alumina is preferred, other types of solid acidic supports may be used, such as, for example, silica-magnesia and natural or synthetic crystalline zeolites.

The hydrogenation component must be a strong hydrogenation catalyst such as nickel, platinum or palladium. However, these hydrogenation catalyst components alone have not proved suitable to achieve the proper balance of catalytic functions. We have discovered that by combination of one of the above metals with tungsten, a suitable hydrogenation component results. Tungsten has a pronounced promoter effect on catalytic activity and at the same time retards excessive hydrogenation. For example, it has been found that substantially increased nickel content on a catalyst consisting of nickel, fluoride and silica-alumina is required to match the activity of a catalyst consisting of nickel-tungsten-fluoride on silica-alumina. However, if the high nickel catalyst is completely reduced to its metallic state, excessive hydrogenation of benzene to cyclohexane occurs. The hydrogenation function of the catalyst is therefore preferably supplied by the combination of tungsten with either nickel, platinum or palladium to achieve the balance of dual catalytic function essential to the process.

Thus, the preferred catalyst of the process of the present invention is a combination of a hydrogenation component which is tungsten with either nickel, platinum or palladium, and an acidic component which is a halogen and an acidic support preferably silica-alumina, silica-magnesia or crystalline zeolite.

The catalyst may be prepared by any of several methods known in the art. The solid support may be impregnated with the metals and halogen or the desired combination may be produced by hydrogel techniques. Hydrogel preparation is preferred, but excellent results have been obtained with impregnated catalysts.

Tungsten content may be as low as 0.1 percent weight (basis finished catalyst) but it is preferred that the content be above 1.0 percent weight. Tungsten content may be as high as 15.0 percent weight but a maximum of 8.0 percent weight is preferred. Nickel, platinum or palladium is preferably not above 3.0 percent weight but 10.0 percent may be used; the content may be as low as 0.1 percent. Halogen content should be lower than 5.0 percent weight and above 0.1 percent weight. However, it is preferred that no more than 3.0 percent halogen be used.

For activation, the catalyst must be calcined and the metal components reduced with hydrogen. Calcination may be accomplished at temperatures between 400° C. and 600° C. for period of time between 0.5 and 4 hours. Prereduction conditions depend to some extent on the amount and nature of the hydrogenation metal and the calcination temperature. If the hydrogenation metal content is high and/or the calcination temperature is high, milder reduction conditions are preferred. In general, it is preferred to reduce the catalyst at temperatures of at least 175° C. and more preferably at least 275° C. Temperature as high as 400° C. but preferably not over 325° C. can be used. Prereduction is conducted for 0.1 to 2.0 hours under hydrogen pressure of between 300 and 1200 p.s.i.g. Where the catalyst has a high hydrogenation metal content prolonged prereduction leads to excessive hydrogenation activity. Thus, where nickel, platinum or palladium content of the catalyst is greater than 2.0 percent by weight reduction time should be held to less than 1 hour and reduction temperature to 300° C. or lower.

In order to maintain catalyst activity and selectivity for continuous operation it has been found that sulfur or sulfur compounds and water must be substantially excluded from the feed. Sulfur content is preferably below 1.0 part per million weight (p.p.m. w.) and water preferably below 20 parts per million weight (p.p.m. w.). Sulfur or sulfur compounds in the feed deactivate the hydrogenation metal component and cause loss in activity. Selectivity is also impaired due to the resulting imbalance in catalytic functions. Water in the feed influences the catalyst acidity function and may strip off halogen. Again, the imbalance in catalytic functions results in loss in catalyst selectivity. Pretreatment of the feed over molecular sieves (for example, Linde 4A sieves) has been found adequate to accomplish both sulfur and water reduction to a satisfactory level. Of course, in many commercial applications, as when the feed is taken directly from a commercial catalytic reforming benzene recovery plant, no feed treatment will be required; the feed being substantially free of sulfur and water.

The reaction of the invention may be carried out in the presence of the above described catalyst at temperatures as low as 100° C. and under hydrogen pressure of 400 p.s.i.g. However, it is preferred that the temperature be at least 175° C. and hydrogen pressure of at least 600 p.s.i.g. Temperature may be as high as 400° C. but it is preferred that no higher than 250° C. be employed. Hydrogen pressure not exceeding 1000 p.s.i.g. are also preferred. Space velocity, defined as volume of feed per volume of catalyst per hour (LHSV) should be at least 0.1 and not over 4.0. However, it is preferable that the LHSV be at least 0.5 and not above 2.0.

The nature of the reaction lends itself to batch, semicontinuous or continuous operation. However, continuous operation is more suitable for commercial utilization. The reaction may be carried out with partially liquid, partially gaseous phase reactants, i.e., so-called "trickle" phase operation, but it has been found that operation in which hydrocarbons are in the liquid phase gives better results.

In the operation of processes in a continuous manner, it is customary to inject the reactants into the top of the reactor allowing them to flow downward over the catalyst. Hydrogen may be fed cocurrently or countercurrent to the feed. It has been found, however, that when the reaction was conducted as described above, excessive hydrogenation occurred. The possible explanation for this result is the accessibility of hydrogen to the strong hydrogenation catalyst component. Thus, the reaction becomes unbalanced in favor of hydrogenation. It has been found particularly advantageous that the reaction be carried out in a reactor which is substantially liquid filled where both the reacting hydrocarbon and hydrogen are accessible to the catalyst in the correct proportions, i.e., preferential absorption of hydrogen by the catalyst is prevented. These conditions, can be met by feeding benzene and hydrogen to the bottom of the reaction zone and removing products from the top. When conducted in this "up-flow" manner catalyst stability and product selectivity is substantially improved. Thus, it is preferred that the reaction be carried out in an "up-flow" reactor with the hydrocarbons substantially in the liquid phase. Moreover, the advantages of "up-flow" liquid phase operation in improving operation stability are not limited to the catalyst system herein described, but are also applicable to processes in which known catalysts are used.

It is desirable to carry out the reaction at conversion levels below 50 percent basis feed. At higher conversions, loss of selectivity to cyclohexane and trimeric products become significant. Therefore, it is desirable to separate unconverted benzene for recycle to the reaction zone.

In summary, the preferred embodiment of the present invention is a process which comprises contacting benzene (containing little if any sulfur, sulfur compounds or water) in an "up-flow reactor" (where hydrocarbon is substantially in the liquid phase) at a temperature of 175° to 250° C., a LHSV of 0.5 to 2.0 and under hydrogen pressure of 600 to 1500 p.s.i.g. with a catalyst which consists of a composite of (1) tungsten and either nickel, platinum or palladium, (2) halogen and (3) an acidic solid carrier. Phenylcyclohexane is recovered from the reaction product.

The process of the invention will now be illustrated with reference to the appended drawing which is a schematic representation of a preferred embodiment of the invention.

Benzene feed to the process comes in by line 11 where it enters pretreater 1. Pretreater 1 is a packed column or columns which contain a suitable adsorbent for water and hydrogen sulfide, such as, for example, Linde 4A molecular sieves. Pretreatment of the benzene feed is performed to reduce the sulfur content to less than 1.0 p.p.m. weight and water content to less than about 20 p.p.m. weight. It will, of course, be understood that no pretreatment step will be required in these cases where the benzene meets the specifications set out above.

From the pretreater benzene flows via line 12 and is joined by recycle benzene flowing in line 29. Both fresh and recycle benzene enter reactor 2 via line 14.

Fresh hydrogen or hydrogen-containing gas enters the system in line 16, joins recycle hydrogen gas from line 21 and the combined stream enters reactor 2 through line 22.

Both hydrogen gas and benzene feed pass upward through the reaction zone. Reactor 2 contains a fixed bed of catalyst pellets which are a composite of (1) tungsten, (2) nickel, platinum or palladium and (3) fluorine supported on an acid-acting silica-alumina base. The catalyst is calcined and prereduced prior to use in the reaction process. Calcination may be carried out in-situ but preferably at the time of manufacture. Calcination in-situ could cause corrosion of process equipment. Prereduction of the catalyst, on the other hand, is more effectively and efficiently carried out in-situ in the reactor since the necessary equipment is available and prereduction immediately prior to use can be accomplished.

Reaction conditions depend upon several factors as for example, catalyst composition, feed purity and desired conversion level. In one embodiment reactor 2 is maintained at a pressure of 800 p.s.i.g. The amount of catalyst used and the feed flow rate is adjusted to give a LHSV of 1.0.

Reaction products, unreacted feed and hydrogen leave the reaction zone by line 18 and enter a separator 4. In separator 4 hydrogen and light gas are removed overhead via line 21 for recycle to reactor 2. Unreacted feed and reaction products pass through line 24 to a first distillation column 6. In column 6 hydrocarbons lighter than phenylcyclohexane—primarily benzene and cyclohexane—are substantially removed via line 26.

This stream in line 26 goes to column 8 for separation of benzene for recycle to the reactor 2. It may also be desirable that this stream which consists primarily of benzene and cyclohexane be dehydrogenated in a reaction process suitable for conversion of cyclohexane to benzene and the resulting benzene recycled to reactor 2. Any suitable dehydrogenation process known to the art may be used such as, for example, a platinum catalyst reforming process.

The bottom stream from column 6 via line 28 is fed to column 9 where phenylcyclohexane is substantially recovered and passes to storage or subsequent use in line 34. The bottom stream from column 9, which is primarily trimer, is removed via line 36.

The above is intended as an illustration of an embodiment of the present invention and many variations may be applied by those skilled in the art which are within the scope of the invention.

The following examples are included to further illustrate the invention and not to imply a limitation thereon.

Example I

Catalysts were prepared with final compositions shown in Table 1.

TABLE 1.—CATALYST COMPOSITION

| Preparation | Base | Composition, percent w. | | | | |
|---|---|---|---|---|---|---|
| | | Ni | Pt | Pd | F | W |
| Catalyst: | | | | | | |
| A | Impregnated | Silica-alumina [1] | 0.8 | | | 0.68 | 11.7 |
| B | do | do.[1] | 0.4 | | | 0.41 | 11.8 |
| C | Hydrogel | do.[2] | 1.63 | | | 0.79 | 7.3 |
| D | do | do.[2] | 1.20 | | | 1.82 | 4.5 |
| E | Impregnated | do.[1] | | | 0.09 | 1.94 | 9.2 |
| F | do | do.[1] | | 1.4 | | 2.04 | 8.4 |

[1] 25% weight Al$_2$O$_3$; 75% weight SiO$_2$.
[2] 23% weight Al$_2$O$_3$; 77% weight SiO$_2$.

The impregnated catalysts were prepared from silica-alumina chips which had been calcined at 600° C. for 6 hours to remove stearic acid binder. Nickel was added by adsorption from nickel fluoride. Tungsten and additional fluoride were added by total impregnation from ammonium metatungstate and ammonium fluoride respectively. The resulting catalysts, after filtration and washing, were calcined at 500° to 550° for 1 to 3 hours. Platinum- and palladium-containing catalysts were prepared by total impregnation of silica-alumina powder (as above) with aqueous solutions of the ammine chlorides. Fluorine was added as aqueous hydrogen fluoride. The resulting catalysts, after filtration and washing, were calcined by the same procedure as the nickel catalyst.

The hydrogel catalyst was prepared by co-gelling silica and alumina from sodium silicate and aluminum sulfate. Nickel, fluoride and tungsten were added to the co-gel (as the same components used in impregnation) in aqueous solution. After stirring the mixture for at least 4 hours it was filtered and washed with water, the catalyst extruded, dried for 12 hours at 120° C. and calcined at 500° C. for 2 hours.

Example II

Reaction studies with the catalyst described in Example I were made by placing benzene and freshly calcined catalyst in an 85-ml. magnetically stirred autoclave. Hydrogen was introduced and the system heated for prereduction of the catalyst. Catalysts listed in Table 1 were prereduced at 300° C. under 800 p.s.i.g. hydrogen pressure for times between 0.25 and 1.0 hours. The system was then cooled and benzene introduced. The products were analyzed by gas-liquid chromatography and infra-red techniques. Trimer was identified by mass spectrometry as having the empirical formula C$_{18}$H$_{26}$.

The results are shown in Table 2. As can be seen the catalysts perform well in the conversion of benzene to phenylcylohexane.

TABLE 2

[Autoclave Results; 200° C., 800 p.s.i.g. Hydrogen]

| Run | Catalyst | Percent Conv. Basis Feed | Selectivity percent [1] | | | | |
|---|---|---|---|---|---|---|---|
| | | | MlCP | CH | Trimer | BiCH | PhCH |
| 1 | A | 16.6 | 0.5 | 10.4 | 10.6 | 2.7 | 75.8 |
| 2 | B | 18.4 | 1.1 | 6.4 | 8.6 | 3.7 | 80.6 |
| 3 | C | 22.7 | 2.0 | 7.6 | 7.5 | 5.6 | 78.2 |
| 4 | D | 21.6 | 1.6 | 7.3 | 9.0 | 4.8 | 77.4 |
| 5 | E | 19.9 | 4.3 | 8.8 | 5.9 | 6.0 | 74.9 |
| 6 | F | 29.0 | 2.2 | 17.4 | 10.8 | 5.1 | 64.5 |
| 7 [2] | G | 15.6 | 7.2 | 13.6 | 19.2 | 9.7 | 50.1 |

[1] Selectivity basis converted products; MlCP, methylcyclohexane; CH, cyclohexane; trimer, C$_{18}$ hydrocarbon; BiCH, bicyclohexane; PhCH, phenylcyclohexane.
[2] Benzene with 0.1% w. thiophene added.

Benzene used for these studies was analytical grade which contained 0.3 p.p.m. weight sulfur and 60–160 p.p.m. weight water. Before use the benzene was treated with molecular sieves (Linde 4A) thereby reducing sulfur by about half and water to less than 8 p.p.m.

Comparison of runs 5 and 7 show the effect of sulfur in the feed. Addition of 0.1 percent weight thiophene to the feed reduced phenylcyclohexane selectivity from 74.9 to 50.1 percent.

Example III

The stability of the catalyst for continuous operation is demonstrated by the data in Table 3. Benzene was pumped through a bed of Linde 4A molecular sieves resulting in a reduction of sulfur content to 0.03 p.p.m. weight and water content to less than 8 p.p.m. weight. Thus treated, the benzene was passed, together with hydrogen, upwards through a bed of Catalyst C (Table 1) which was maintained at a temperature of 150° to 165° C. and a pressure of 800 p.s.i.g. As Table 3 shows selectivity to phenylcyclohexane remained substantially constant over 123 hours of operation although conversion dropped from 27.8 to 15.3% basis benzene feed.

TABLE 3.—CONTINUOUS OPERATION

[Catalyst, C (Table 1.); Temperature, 150° C. to 165° C.; Pressure, 800 p.s.i.g.; Hydrogen, 0.09 liters per CC benzene]

| Time, hour | Percent Conv. Basis Benzene | Selectivity | | | | |
|---|---|---|---|---|---|---|
| | | MlCP | CH | Trimer | BiCH | PhCH |
| 29 | 27.8 | 1.3 | 13.5 | 19.1 | 2.6 | 63.5 |
| 47 | 26.1 | 1.1 | 15.4 | 18.3 | 2.5 | 62.6 |
| 84 | 24.7 | 1.1 | 16.2 | 17.7 | 2.6 | 62.4 |
| 100 | 17.1 | 0.5 | 15.9 | 15.5 | 2.7 | 65.3 |
| 123 | 13.3 | 0.7 | 15.3 | 13.0 | 2.1 | 68.9 |

We claim as our invention:

1. A process for the production of phenylcyclohexane which comprises contacting benzene in the presence of hydrogen with a calcined and reduced catalyst which consists essentially of (1) tungsten, (2) a hydrogenation component selected from the group consisting of nickel, platinum, palladium and mixtures thereof, (3) halogen and (4) an acidic solid support.

2. The process of claim 1 wherein the benzene has a sulfur content of less than 1.0 parts per million by weight and a water content of less than 8.0 parts per million by weight.

3. The process of claim 1 wherein the tungsten content of the catalyst is between 0.1 to 15.0 percent by weight basis finished catalyst, the hydrogenation component is between 0.1 to 10.0 percent by weight basis finished catalyst and the halogen content is between 0.1 to 5.0 percent by weight basis finished catalyst.

4. The process of claim 1 wherein the halogen is fluorine.

5. The process of claim 1 wherein the acidic solid support is silica-alumina.

6. The process of claim 2 wherein the reaction is carried out in a continuous manner substantially in the liquid phase and in which the benzene and hydrogen are passed cocurrently upwardly through a bed of the catalyst.

7. The process of claim 2 wherein the recation is carried out at a temperature between 100° to 400° C., a pressure between 400 to 1500 p.s.i.g., and a liquid volume rate per hour per volume of catalyst of between 0.1 to 4.0.

8. A process for the production of phenylcyclohexane which comprises contracting benzene in the presence of hydrogen with a catalyst which comprises a hydrogenation component and an acidic component supported on a solid support in which the benzene and hydrogen are passed cocurrently upward through a bed of the catalyst and in which the benzene and reaction products are in the liquid phase at a temperature of between 100° to 400° C., a pressure between 400 to 1500 p.s.i.g., and a liquid volume rate per hour per volume of catalyst of between 0.1 to 4.0.

References Cited

UNITED STATES PATENTS

| 2,967,204 | 1/1961 | Beuther et al. | 260—667 |
| 3,153,678 | 10/1964 | Logemann | 260—667 |
| 3,244,721 | 4/1966 | Bain et al. | 260—670 |
| 3,274,276 | 9/1966 | Louvar | 260—668 |
| 3,317,611 | 5/1967 | Louvar et al. | 260—667 |

DELBERT E. GANTZ, *Primary Examiner.*

C. R. DAVIS, *Assistant Examiner.*